United States Patent [19]

Nail

[11] 4,185,482

[45] Jan. 29, 1980

[54] LOCK DECODING MECHANISM

[76] Inventor: William B. Nail, 247 Terrace Park, Rochester, N.Y. 14619

[21] Appl. No.: 880,657

[22] Filed: Feb. 23, 1978

[51] Int. Cl.[2] .......................... E05B 19/20; G01B 5/20

[52] U.S. Cl. ...................................... 70/394; 33/174 F

[58] Field of Search ............. 70/394, 398, 401, 364 R; 33/174 F, 174 P, 174 PA, 175

[56] References Cited

U.S. PATENT DOCUMENTS

| | | | |
|---|---|---|---|
| 1,965,336 | 7/1934 | Fitzgerald | 70/364 R |
| 1,991,151 | 2/1935 | Hansen | 33/174 F |
| 2,087,423 | 7/1937 | Abrams | 70/394 |
| 2,279,592 | 4/1942 | Machinist | 70/394 |
| 2,338,768 | 1/1944 | Johnstone | 70/394 |
| 2,720,032 | 10/1955 | Harwell | 33/174 F |
| 3,827,151 | 8/1974 | Naill | 70/394 |

*Primary Examiner*—Kenneth Dorner

*Attorney, Agent, or Firm*—Lawrence P. Kessler

[57] ABSTRACT

A mechanism for opening and/or decoding the biddings of a key for opening a cylinder lock. The mechanism comprises a housing having a forward projection shaped in the form of a key body and an abutment surface spaced from the forward projection disposed to abut the cylindrical plug of the lock when the forward projection of the housing is inserted in the keyway of the lock. A plurality of shims, including at least one shim associated with each lock tumbler, are supported in the housing, for longitudinal movement within the housing. Each of the shims have an elongated portion directed toward and supported in the forward projection of the housing and a tumbler actuating cam extending from the elongated portion. A plurality of actuators are associated with the plurality of shims respectively. Each actuator is selectively shiftable for moving its respective shim with respect to the associated tumbler to position the tumbler for opening the lock. Indicia on the housing associated with the actuators indicates the positions of the actuators corresponding to the respective positions of each of the tumblers whereby the biddings of a key to move said tumblers to their respective positions to open the lock may be determined.

3 Claims, 8 Drawing Figures

LOCK DECODING MECHANISM

BACKGROUND OF THE INVENTION

1. Field of the Invention

This invention relates generally to cylinder locks and more particularly to a mechanism for opening and/or decoding the biddings of a key for opening a cylindrical lock.

2. Description of the Prior Art

One type of lock mechanism in wide use today is the cylinder lock. Examples of cylinder locks include pin-type tumbler locks, waffer-type tumbler locks, lever locks and combination locks. A common application for cylinder locks is in automobile doors and ignitions. In general these locks function by adjusting the elements of the lock tumblers to particular respective depths within the cylindrical lock member to enable the cylindrical lock member to rotate relative to its housing body. When the tumblers are adjusted by a key, the key must have a specific configuration to cam all the tumblers to their particular respective depths. If the key has been lost or damaged, it is necessary to provide some mechanism for causing the tumblers to move to their respective depths. Such mechanisms are generally classified as lock picking devices. Although various lock picking devices have been designed to open the cylinder locks by exerting a camming action on the tumblers, they do not enable the particular respective depths of the tumblers to be ascertained such that a new, properly configured key may be made.

To overcome the problem of providing a new properly configured key to replace a lost or damaged one, several mechanisms have been proposed as shown for example in U.S . Pat. Nos. 2,338,768 (Johnstone) and 3,827,151 (Naill). These mechanisms, called decoders, include a plurality of shims having respective cam surfaces. In the mechanism of the Johnstone patent a complicated arrangement of individual shims of various depths are required to determine the appropriate depths of pin type tumblers and corresponding biddings. In the mechanism of the Naill patent the shiftable shims, which have cam teeth with inclined sides of uniform height, are only capable of determining the depths of pin-type tumblers; and the mechanism is not capable of accurate location relative to the tumblers so that false bidding readings may occur.

SUMMARY OF THE INVENTION

It is the purpose of this invention to provide a mechanism for opening and/or decoding the biddings of a key for opening a cylinder lock of the type having a shell and a cylindrical plug mounted in the shell for relative rotation thereto. A keyway is defined in the cylindrical plug and a series of movable tumblers are supported in the cylindrical plug and disposed in intersecting relationship with the keyway. The tumblers, which are urged toward respective first portions for preventing relative rotation of the plug and shell, are movable to respective second positions by the biddings of the key when inserted in the keyway thereby enabling the plug to be rotated relative to the shell by the key.

The mechanism comprises a housing having a forward projection shaped in the form of a key body and an abutment surface spaced from the forward projection disposed to abut the cylindrical plug when the forward projection of the housing is inserted into the keyway. A plurality of shims, including at least one shim associated with each tumbler, are supported in the housing, for longitudinal movement within the housing. Each of the shims have an elongated portion directed toward and supported in the forward projection of the housing and a tumbler actuating cam extending from the elongated portion. The tumbler actuating cam is in the shape of a tooth of a height greater than the maximum movement of any of the tumblers from its first to its second position. The tooth has one face extending perpendicularly from the elongated portion to its full height and a second oppositely directed inclined face and is located along the elongated portion at a distance from the end thereof so as to position the inclined face adjacent to a respective tumbler when the housing is inserted into the keyway to a depth at which the abutment surface abuts against the plug. A plurality of actuators are associated with the plurality of shims respectively. Each actuator is selectively shiftable for moving its respective shim such that the inclinded face moves with respect to the associated tumbler to position the tumbler in its second position to permit the lock to be opened. Indicia on the housing associated with the actuators indicates the positions of the actuators corresponding to the respective second positions of each of the tumblers, whereby the biddings of a key to move said tumblers to their respective second positions may be determined.

The invention, and its objects and advantages, will become more apparent in the detailed description of the preferred embodiments presented below.

BRIEF DESCRIPTION OF THE DRAWINGS

In the detailed description of the preferred embodiment of the invention, reference is made to the accompanying drawings, in which.

DESCRIPTION OF THE PREFERRED EMBODIMENT

Figure 1:
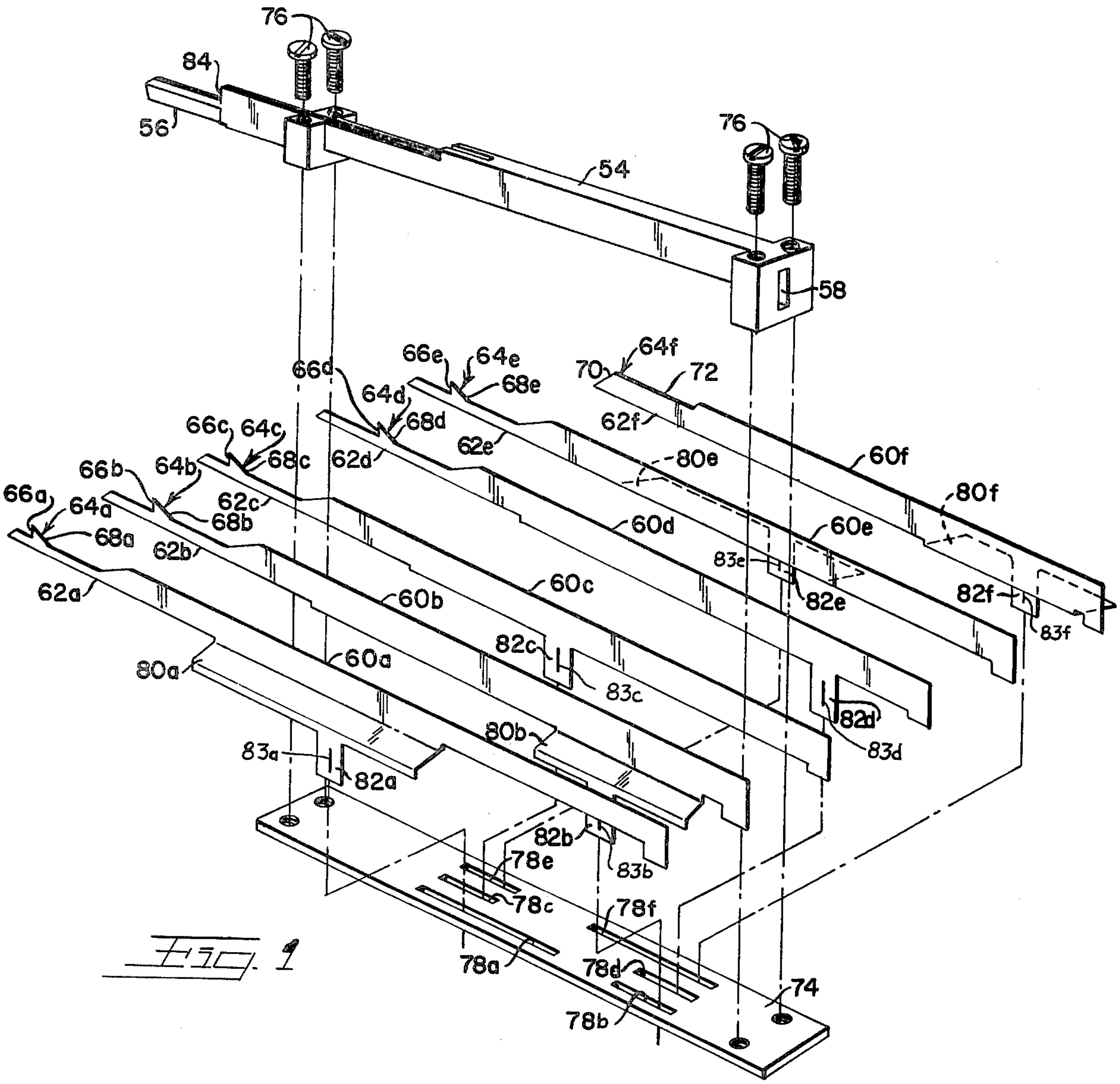
FIG. 1 is an exploded view in perspective of the mechanism for opening and/or decoding the biddings of a key wof opening a cylinder lock according to this invention.

Referring now to the drawings, the lock decoding mechanisms of this invention is designated generally by the 10 in the exploded view of FIG. 1. The mechanism 10 is intended to open and/or decode locks typically referred to as cylindrical locks. One type of cylindrical lock is the sidebar lock 12, which is illustratively shown in FIGS. 2 through 5. While the mechanism 10 will be described in relation to the sidebar lock 12, it is of course understood that the mechanism can be used with any typical cylindrical lock.

Figure 3:
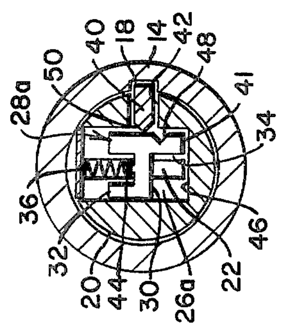
FIG. 3 is a cross-section view looking from the end of the cylinder lock showing a tumbler in position to prevent relative rotation of the elements of the lock.
Figure 2:
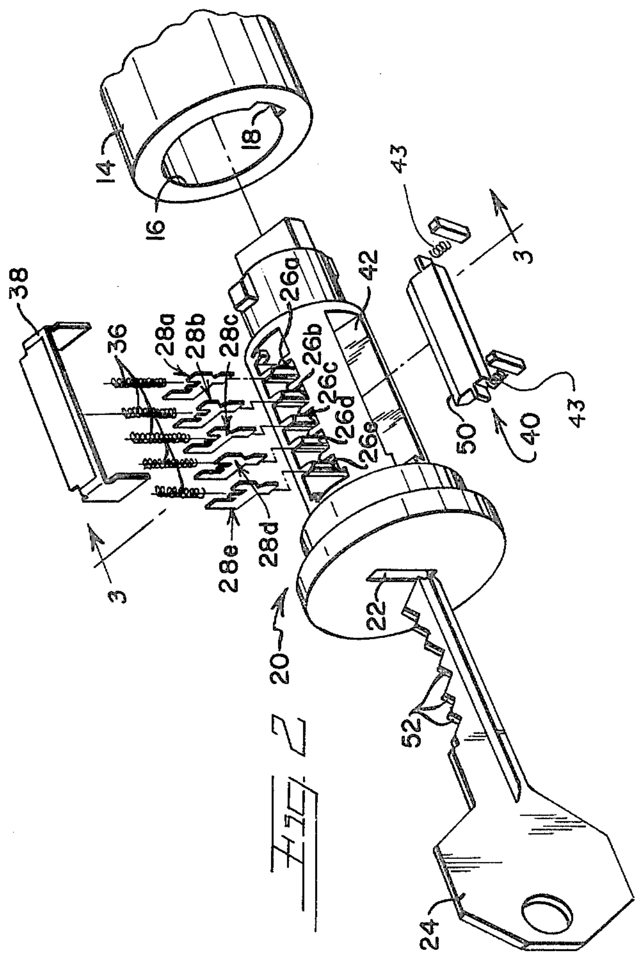
FIG. 2 is an exploded view in perspective of a typical sidebar cylinder lock.

The sidebar lock 12 includes a shell 14 having an internal cylindrical bore 16 and a longitudinal locking slot 18 (FIG. 2). A cylindrical plug 20 is supported in the bore 16 for relative rotation within the bore. The plug 20 has a keyway 22 defined by the body of the plug extending longitudinally through the body for receiving a lock opening key 24. The body of the plug 20 also defines a series of aligned chambers 26a–26e through which the keyway 22 extends. A sidebar 40, located in a longitudinal slot 42 defined in the body of the plug 20 extending into the plug perpendicularly to the chambers 26a–26e is urged radially inwardly of the plug 20 by springs 43. A series of waffer like tumblers 28a–28e are movably supported in the series of chambers 26a–26e respectively. Each tumbler 28a–28e has a cross member 30 joining a short side member 32 and a long side member 34. Springs 36, located between the spring retainer 38 and projections 44 on respective cross members 30, urge the tumblers in a direction such that the end 41 of the long side members 34 engage the base 46 of the respective chambers 26a–26e. The long side members 34 each have a camming surface along the side of the member with a V-shaped notch 48 in the camming surface. The sidebar 40 is urged radially outwardly in the slot 42 of the plug 20 by the camming surface of members 34 so as to extend into the locking slot 18 to prevent relative rotation of the plug in the shell 14 (FIG. 3).

The V-shaped notches 48 in the long side members 34 of the tumblers 28a–28e are located at varying heights above the end 35 of the long side members. Thus, the tumblers 28a–28e must be moved to different vertical heights to align the V-shaped notch 48 of each tumbler with a V-shaped lead end 50 of the sidebar 40. Movement of the tumblers 28a–28e to the proper alignment height is controlled by insertion of the key 24 into the keyway 22. The key 24 has a plurality of teeth which form notches 52 for alignment with the plurality of tumbers 28a–28e respectively when the key is fully inserted in the keyway. The depth of the notches 52, called the biddings of the key, are such that when the cross members 30 of respective tumblers 28a–28e are in engagement with respective notches 52 each tumbler is raised to the height to align the V-shaped notch 48 thereof with the V-shaped lead end 50 of the sidebar 40. As the notches 48 are moved into alignment with the lead end 50, the sidebar mates with the notches and moves radially inward to the slot 42 to the position shown in FIG. 5. In this position the sidebar 40 is out of slot 18 and plug 20 is free to be rotated relative to the shell 14 by the key 24 to perform the unlocking function.

The lock decoding mechanism 10 for opening and/or determining the biddings of the key for opening the cylindrical lock 12, has a housing 54 with a forward projection 56 in the shape of the body of a key. A channel 58 is formed longitudinally through the length of the housing 54. The channel 58 accommodates a plurality of shims 60a–60f slidable in the channel. The upper portion 57 of the forward projection 56 intersects the channel 58 to expose the portions of the shims 60a–60f extending therethrough. Shims 60a–60e are adapted to be associated with respective tumblers 28a–28e when the mechanism 10 is inserted in the keyway 22. In construction, the shims 60a–60f have elongated portions 62a–62f which are supported in the portion of channel 58 through forward projection 56. Tumbler actuating cams 64a–64f extend from the respective elongated portions 62a–62f upwardly through the upper portion 57 of the forward projection 56. The cams 64a–64e are each in the shape of a tooth having a lead edge 66a–66e perpendicular to the elongated portion 62a–62e and a surface 68a–68e inclined from the lead edge to the elongated portion facing toward the rear of the forward projection 56. Each tooth is of a height greater than the maximum degree of vertical movement of the tumblers 28a–28e. The cam 64f has an inclined surface 70 facing the lead end of the elongated portion 62f and a camming surface 72 parallel to the bottom surface of the elongated portion. The camming surface 72 is of a height greater than the maximum degree of vertical movement of the tumblers 28a–28e.

Figure 8:
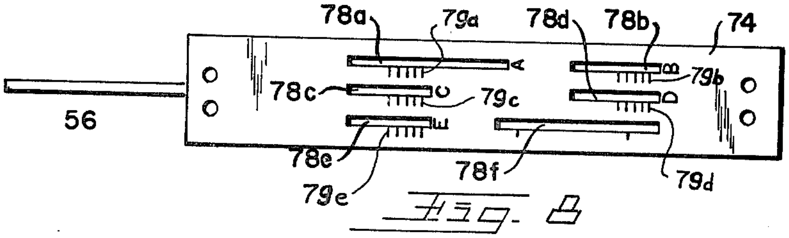
FIG. 8 is a bottom plan view of the decoding mechanism of this invention.
Figure 6:
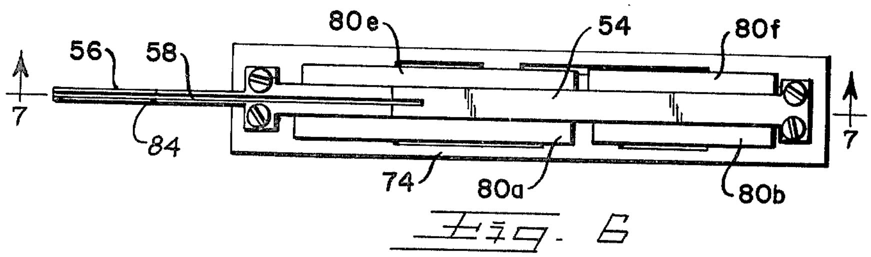
FIG. 6 is a top plan view of the decoding mechanism according to this invention.

An indicia plate 74 is secured to the housing 54 by means of fasteners 76. The plate 74 has a plurality of apertures 78a–78f (FIGS. 1 and 8). Actuator arms 82a–82f extend from the shims 60a–60f respectively through the apertures 78a–78f in the plate 74. The apertures 78a–78f are appropriately labeled to enable ready recognition of which actuator arm is associated with which tumbler controlling shim. The indicia plate has indicia markings 79a–79f adjacent each aperture. Indicia markings 83a–83f on the actuator arms 82a–82f respectively align with the markings 79a–79f to permit determination of the location of the cam 64a–64f of a respective shim 60a–60f. Shims 60a, 60b, 60e and 60f have slide surfaces 80a, 80b, 80e and 80f extending generally perpendicular from their respective shim. The slide surfaces allow the actuator arms to be spaced apart a distance to permit easy manual manipulation and to enable each shim to be moved longitudinally in the channel 58 of the housing 54 independently of the remaining shims. The housing 54 of the mechanism 10 has an abutment surface 84 adjacent the forward projection 56. The abutment surface 84 is particularly located relative to the forward projection 56 and the indicia plate 74. Thus, when the forward projection is fully inserted in the keyway 22, the abutment surface will be engaged with the plug 20 so that the tumbler actuating cams 64a to 64e are generally aligned with respective tumblers 22a–28e and indicia plate 74 is accurately positioned with respect to the tumblers.

Figure 4:
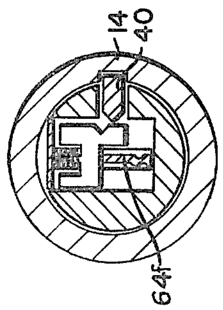
FIG. 4 is a cross-sectional view of the cylinder lock, similar to FIG. 3, showing the tumbler moved to its maximum height.

With the lock 12 and the decoding mechanism 10 described above the operation for opening and/or decoding the lock 12 with the mechanism 10 is as follows: Before inserting the forward projection 56 into the keyway 22 of the lock 12, actuator arm 82f is moved forwardly (to the left in FIG. 8) until the indicia 83f on the actuator arm is aligned with the forward most indicia mark immediately adjacent to aperture 78f. When these indicia are in alignment, the shim 60f is positioned such that the inclined surface 70 is adjacent to the lead end of the forward projection 56. Thus as the forward projection 56 is inserted in the keyway 22, the inclined surface 70 will urge each of the tumblers 28a–28e upwardly in turn toward their position of maximum vertical height where they will ride on surface 72 (FIG. 4). When the tumblers are all in their position of maximum vertical height, the V-shaped notches 48 of each tumbler are above the V-shaped lead end 50 of the sidebar 40. The sidebar 40 thus remains in its position to prevent relative rotation between the plug 20 and the shell 14.

Figure 7:
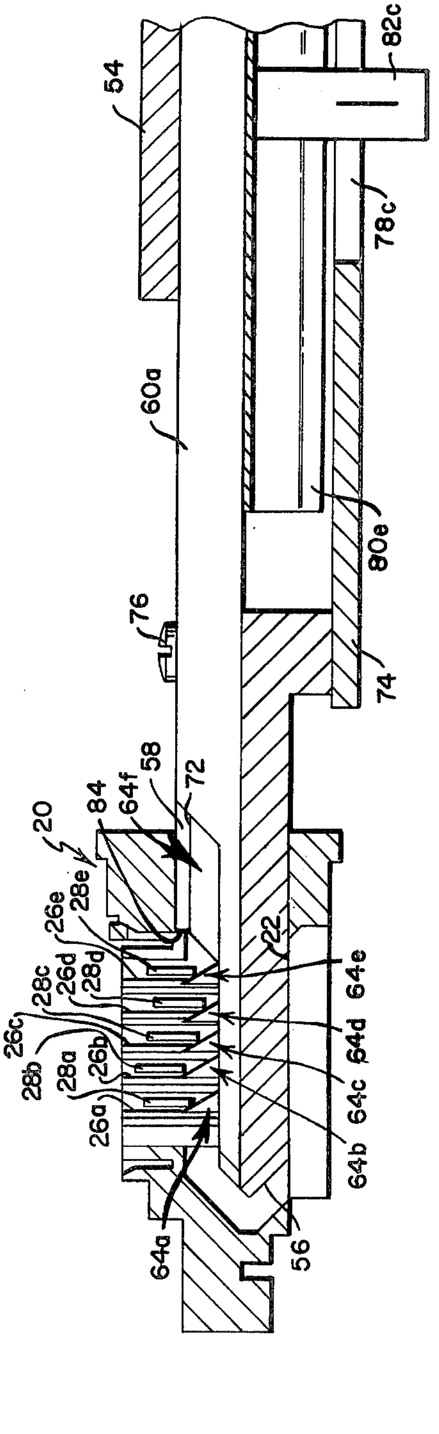
FIG. 7 is a side elevational view, in cross section, of the decoding mechanism of this invention taken along the lines 7—7 of FIG. 6.

After the mechanism 10 has been fully inserted in the keyway 22, the abutment surface 84 is engaged with the forward surface of the plug 20. This establishes the proper positioning of the decoding mechanism 10 with respect to the lock 12. That is to say with the surface 84 mated with the plug 20, the tumbler actuating cams 64*a*–64*e* are generally aligned with respective tumblers 28*a*–28*e* and the indicia plate 74 is accurately positioned with respect to the tumblers. The shim 60*f* is then withdrawn by moving the actuator arm 82*f* rearwardly until the indicia on the actuator arm is aligned with the rear most indicia mark immediately adjacent to aperture 78*f* (FIG. 7). As the shim 60*f* is withdrawn the surface 72 releases the tumblers in order. Under the urging of springs 36 the tumblers move to engage the respective inclined surfaces 68*a*–68*e* of cams 64*a*–64*e* (FIG. 7). It is clear from FIG. 7 that since the cams 64*a*–64*e* each have vertical faces decoding mechanism 10 is capable of performing its desired decoding and/or opening function on locks in which the tumblers are closely packed without any one tumbler actuating cam interfering with the action of an adjacent tumbler under the influence of the respective tumbler actuating cam.

Figure 5:
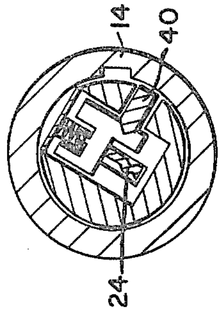
FIG. 5 is a cross sectional view of the cylinder lock similar to FIG. 3, showing the tumblers aligned with the sidebar to permit relative rotation of the elements of the lock.

After all of the tumblers 28*a*–28*e* have been released by shim 60*f*, the shims 60*a*–60*e* are individually manually manipulated via their respective actuators 82*a*–82*e*. For example, shims 60*a* is manipulated so that the inclined surface 68 moves the respective tumbler 28*a* up or down until the V-shaped slot 48 in the long side member 34 mates with the V-shaped lead end 50 of the sidebar 40. The mating action provides a limited resistance which can be felt at the actuator arm 82*a*. When this resistance is noted, the indicia mark 83*a* on the actuator arm 82*a* will be aligned with a particular indicia mark immediately adjacent to aperture 78*a*. The particular indicia mark is representative of the corresponding bidding of a key which would move the tumbler 28*a* to an equivalent position. The remaining shims 60*b*–60*c* are then manually manipulated in the same manner until each bidding is determined. Once all biddings have been determined, duplication of the key to open the lock may then readily be accomplished. Furthermore, when all the tumblers have been moved to their respective positions for mating of the V-shaped slots 48 and the V-shaped lead end 50 of the sidebar 40, the sidebar moves out of the slot 18 in the shell 14 to permit relative rotation of the plug 20 and the shell 14 (FIG. 5). The mechanism 10 may then be used to open the cylindrical lock 12.

In most instances when the biddings are determined by the mechanism 10, the side of the plate 74 upon which the bidding indicating indicia 79*a*–79*f* are located is facing down and is therefore difficult to read. In order to preserve the alignment of the indicia markings on the actuators arms 82*a*–82*e* with the indicia on the plate 74 to permit determination of the biddings, before the lead end 56 is withdrawn from the keyway 22, the shim 60*f* is first moved forwardly into the keyway 22 by actuator 82*f*. The inclined surface 70 cams the tumblers 28*a*–28*e* to their maximum vertical height onto the surface 72. When the shim 62*f* is fully inserted the mechanism 10 may be readily removed from the lock 12 without disturbing the positioning of shims 60*a*–60*e*. The indicia plate 74 can then be viewed and the corresponding biddings of the key to open this lick may be read from the alignment of the indicia marking on the actuator arms 82*a*–82*e* and the indicia adjacent to the apertures 78*a*–78*e*.

The invention has been described in detail with particular reference to the preferred embodiment thereof, but it will be understood that variations and modifications can be effected within the spirit and scope of the invention.

I claim:

1. Mechanism for opening and/or decoding the biddings of a key for opening a cylinder lock, said lock being of the type having a shell, a cylindrical plug mounted in said shell for relative rotation thereto, said cylindrical plug defining a keyway, a series of movable tumblers supported in said cylindrical plug and disposed in intersecting relationship with said keyway, said tumblers being urged toward respective first positions for preventing relative rotation of said cylindrical plug and said shell, said tumblers being movable to respective second positions by the biddings of the key when inserted in said keyway thereby enabling said cylindrical plug to be rotated relative to said shell by said key, said mechanism comprising:

a housing having a forward projection shaped in the form of a key body, an abutment surface integrally formed with said housing spaced from said forward projection and disposed to abut said cylindrical plug when said forward projection of said housing is inserted into said keyway;

a plurality of shims including at least one shim adapted to be associated with each tumbler of said series of tumblers, said shims being supported in said housing for longitudinal movement relative thereto, each of said shims having an elongated portion directed toward and supported on said forward projection of said housing and cam means extending from said elongated portion for activating a tumbler, said cam means being in the shape of a tooth of a height greater than the maximum movement of any of the tumblers from its first to its second position, said tooth having one face extending perpendicularly from said elongated portion to said height and a second oppositely directed inclined face, said tooth being located along said elongated portion at a distance from the lead end thereof so as to position said inclined face in contact with a respective tumbler when said forward projection is inserted into said keyway to a depth at which said abutment surface abuts against said plug;

a plurality of actuators extending transversely from said plurallity of shims respectively, each actuator being longitudinally selectively shiftable for moving its respective shim such that said inclined face moves with respect to its associated tumbler to position said tumbler in its second position; and indicia means on said housing associated with said actuators for indicating the positions of said actuators corresponding to the respective second positions of each of said tumblers whereby the biddings of a key to move said tumblers to their respective second positions may be determined.

2. The invention of claim 1 wherein said inclined face of each tumbler actuating cam tooth is directed away from the lead end of said elongated portion of its respective shim.

3. The invention of claim 2 wherein said plurality of shims further includes a shim having an elongated portion supported in and directed toward said forward projection of said housing, said elongated portion having an inclined face directed toward the lead end of said elongated portion and cam means along one edge thereof for moving each of said tumblers to a height greater than the maximum movement of any of said tumblers from its first to its second position, and an actuator extending transversely from said shim, said actuator being selectively shiftable for moving said shim such that when said forward projection is inserted in said keyway, said inclined face and cam means position all of said tumblers at said height greater than the maximum movement of said tumblers from their first to their second position.

* * * * *